United States Patent
Thacker et al.

(10) Patent No.: US 8,548,287 B2
(45) Date of Patent: Oct. 1, 2013

(54) DIRECT INTERLAYER OPTICAL COUPLER

(75) Inventors: Hiren D. Thacker, San Diego, CA (US);
Xuezhe Zheng, San Diego, CA (US);
Ivan Shubin, San Diego, CA (US);
Kannan Raj, San Diego, CA (US); John E. Cunningham, San Diego, CA (US);
Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 132 days.

(21) Appl. No.: 13/293,624

(22) Filed: Nov. 10, 2011

(65) Prior Publication Data

US 2013/0121635 A1     May 16, 2013

(51) Int. Cl.
*G02B 6/12*     (2006.01)

(52) U.S. Cl.
USPC .......................................................... 385/14

(58) Field of Classification Search
USPC .......................................................... 385/28
See application file for complete search history.

(56) References Cited

U.S. PATENT DOCUMENTS

| 2004/0037497 A1* | 2/2004 | Lee .................................. 385/28 |
| 2005/0069259 A1* | 3/2005 | Tisserand et al. ................ 385/50 |
| 2005/0213912 A1* | 9/2005 | Aalto ............................ 385/129 |
| 2007/0110357 A1* | 5/2007 | Forrest et al. .................... 385/14 |
| 2007/0110369 A1* | 5/2007 | Blauvelt et al. .................. 385/50 |
| 2007/0211989 A1* | 9/2007 | Blauvelt et al. .................. 385/28 |
| 2009/0245728 A1* | 10/2009 | Cherchi et al. .................. 385/28 |
| 2010/0002989 A1* | 1/2010 | Tokushima ...................... 385/14 |
| 2010/0040327 A1* | 2/2010 | Deki et al. ....................... 385/28 |

OTHER PUBLICATIONS

A.V. Krishnamoorthy, et al., "Computer System Based on Silicon Photonic Interconnects", Proc. IEEE, vol. 97, pp. 1337-1361, Jul. 2009.
A.V. Krishnamoorthy, et al., "Optical Proximity Communication with Passively Aligned Silicon Photonic Chips" IEEE Journ. Quant. Electron, Apr. 2009.
Daniel C. Lee et al., "Dual-Layer WDM Routing for Wafer-scale Packaging for Photonically-interconnected Computing Systems", IEEE ECTC, 2011.
J. Cunningham, et al., "Integration and Packaging of a Macrochiop with Silicon Nanophotonic Links", IEEE JSTQE, v. 17, n. 3, May 3, 2011.

* cited by examiner

*Primary Examiner* — Sung Pak
(74) *Attorney, Agent, or Firm* — Park, Vaughan, Fleming & Dowler, LLP; Steven E. Stupp

(57) ABSTRACT

In an MCM, an optical signal is conveyed by an optical waveguide disposed on a surface of a first substrate to an optical coupler having a vertical facet. This optical coupler has an optical mode that is different than the optical mode of the optical waveguide. For example, the spatial extent of the optical mode associated with the optical coupler may be larger, thereby reducing optical losses and sensitivity to alignment errors. Then, the optical signal is directly coupled from the vertical facet to a facing vertical facet of an identical optical coupler on another substrate, and the optical signal is conveyed in another optical waveguide disposed on the other substrate.

20 Claims, 16 Drawing Sheets

DIRECT INTERLAYER OPTICAL COUPLER

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure generally relates to the design of multi-chip modules (MCMs). More specifically, the present disclosure relates to an MCM that directly couples an optical signal between optical waveguides on different substrates.

2. Related Art

Optical signaling based on silicon photonics has the potential to alleviate off-chip bandwidth bottlenecks as well as provide low latency chip-to-chip communication. Interconnects with these capabilities can facilitate new system architectures that include multiple chips, with multi-threaded cores. For maximal density, the physical package for such a system may employ a combination of planar packaging and vertical chip stacking as needed. An example of such a system is a multi-chip module (MCM) or 'macrochip' that includes a logically contiguous piece of photonically interconnected silicon that integrates processors, memory and a system-wide interconnect.

In the macrochip, optical proximity couplers (OPxCs) couple the distributed processors to optical routing layers, which support low-latency, wavelength-division multiplexed (WDM) optical links between chips using silicon-on-insulator (SOI) optical waveguides. These optical waveguides form an interconnect network that provides low-power, high-bandwidth, and high-density communication between the chips in the macrochip. Moreover, each of the chips in the macrochip can be interconnected to every other chip via the WDM optical links that run in orthogonal directions on two routing layers. The optical signals from the chips are coupled into, and between, the routing layers using face-to-face OPxCs.

FIG. 1 presents a block diagram illustrating a side view of an existing MCM with face-to-face OPxCs. In this MCM, an optical signal, which is transported in an optical waveguide on one chip, is reflected out of the plane of the chip surface at a specific angle by a waveguide-integrated mirror on the same chip. This optical signal is then received by an identical waveguide-integrated mirror on another chip, which reflects the optical signal into another optical waveguide on the other chip. However, this approach to optically coupling the optical signal between the chips is often sensitive to alignment and process variations. In addition, the optical path length associated with the optical coupling can result in optical losses because the optical signal is divergent. As a consequence, it can be difficult to obtain high-fidelity signaling in such a multi-chip geometry with low-loss coupling and broadband transmission, which can adversely impact the performance of the macrochip.

Hence, what is needed is an MCM without the problems described above.

SUMMARY

One embodiment of the present disclosure provides a multi-chip module (MCM). This MCM includes a first substrate having a first surface and a second substrate having a second surface. The first substrate includes: a first optical waveguide disposed on the first surface; and a first optical coupler, optically coupled to the first optical waveguide, having a first vertical facet, where the first optical coupler has a first optical mode that is different than a second optical mode associated with the first optical waveguide. Moreover, the second substrate includes: a second optical waveguide disposed on the second surface; and a second optical coupler, optically coupled to the second optical waveguide, having a second vertical facet, where the second optical coupler has a third optical mode that is different than a fourth optical mode associated with the second optical waveguide. Furthermore, the second vertical facet is horizontally displaced relative to and faces the first vertical facet, thereby facilitating direct optical coupling of an optical signal from the first vertical facet to the second vertical facet.

Note that the first optical mode may have a larger spatial extent than the second optical mode, and the third optical mode may have a larger spatial extent than the fourth optical mode. Moreover, the first optical coupler may include a taper that expands a cross-sectional area of the first optical waveguide proximate to the first vertical facet, and the second optical coupler may include another taper that expands a cross-sectional area of the second optical waveguide proximate to the second vertical facet.

Additionally, the first vertical facet and the second vertical facet may, at least in part, define a cavity. This cavity may be filled with air. Alternatively, the cavity may be filled with an index-matching material that has an index of refraction between an index of refraction of the first optical coupler and the second optical coupler and an index of refraction of air.

In some embodiments, the first substrate includes a first recessed region below the first surface and the second substrate includes a second recessed region below the second surface. In these embodiments, the first vertical facet may be aligned with the second recessed region and the second vertical facet may be aligned with the first recessed region, thereby facilitating vertical alignment of the first vertical facet and the second vertical facet.

Furthermore, the first optical coupler may include a third optical waveguide disposed on the first optical waveguide, and the second optical coupler may include a fourth optical waveguide disposed on the second optical waveguide. In some embodiments, the first optical waveguide ends before the cavity and the first vertical facet is associated with the third optical waveguide, and the second optical waveguide ends before the cavity and the second vertical facet is associated with the fourth optical waveguide. Alternatively, the first vertical facet may be associated with the first optical waveguide and the third optical waveguide, and the second vertical facet may be associated with the second optical waveguide and the fourth optical waveguide. In these latter embodiments, vertical overlap of the first vertical facet and the second vertical facet may be associated with the third optical waveguide and the fourth optical waveguide.

In some embodiments, a thickness of the first optical waveguide is increased in the first optical coupler and a thickness of the second optical waveguide is increased in the second optical coupler. As a consequence, in these embodiments the first optical waveguide in the first optical coupler and the second optical waveguide in the second optical coupler are different than tapered optical waveguides.

A variety of techniques may be used to facilitate assembly of the MCM and to maintain alignment of the components. For example, the first substrate may include first negative features recessed below the first surface, and the second substrate may include second negative features recessed below the second surface. The MCM may also include alignment features aligned with and mechanically coupled to pairs of the first negative features and the second negative features, thereby facilitating alignment and maintaining relative positions of the first vertical facet and the second vertical facet. Note that the first negative features and the second negative features may include etch pits. Additionally, the alignment features may include spherical balls.

In some embodiments, at least one of the first negative features and the second negative features includes redundant negative features that prevent damage to the first vertical facet and the second vertical facet if there is an alignment error during assembly of the MCM. Furthermore, the first substrate and the second substrate may include mechanical stops that prevent damage to the first vertical facet and the second vertical facet if there is an alignment error during assembly of the MCM.

Note that the MCM may be implemented using silicon-on-insulator (SOI) technology. As a consequence, a given substrate, which can be the first substrate or the second substrate, may include: a buried-oxide layer disposed on the given substrate; and a semiconductor layer is disposed on the buried-oxide layer, where a given optical waveguide, which can be the first optical waveguide or the second optical waveguide, is defined in the semiconductor layer. Moreover, a given substrate, which can be the first substrate or the second substrate, may include a semiconductor.

Another embodiment provides a method for direct optical coupling an optical signal from the first substrate to the second substrate. During this method, the optical signal is transported in a first optical waveguide disposed on a first surface of the first substrate. Then, the optical signal is optically coupled from the first optical waveguide to a first optical coupler having a first vertical facet which is disposed on the first substrate, where the first optical coupler has a first optical mode that is different than a second optical mode associated with the first optical waveguide. Moreover, the optical signal is directly optically coupled from the first vertical facet to a second vertical facet of a second optical coupler disposed on the second substrate, where the first vertical facet faces the second vertical facet. Furthermore, the optical signal is optically coupled from the second optical coupler to a second optical waveguide disposed on a second surface of the second substrate, where the second surface faces the first surface, and the second optical coupler has a third optical mode that is different than a fourth optical mode associated with the second optical waveguide. Next, the optical signal is transported in the second optical waveguide.

Another embodiment provides a method for assembling the MCM. During this method, alignment features are placed in first negative features disposed on a first surface of the first substrate. Then, the alignment features are mechanically coupled to second negative features disposed on a second surface of the second substrate, thereby aligning and maintaining relative positions of a first vertical facet of a first optical coupler on the first substrate and a second vertical facet of a second optical coupler on the second substrate. Note that the first surface faces the second surface, and the first vertical facet faces the second vertical facet, thereby facilitating direct optical coupling of an optical signal from the first substrate to the second substrate.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a multi-chip module (MCM), a system that includes the MCM, a method for assembling the MCM, and a method for direct optical coupling an optical signal between substrates or chips in the MCM are described. In this MCM, the optical signal is conveyed by an optical waveguide disposed on a surface of a first substrate to an optical coupler having a vertical facet. This optical coupler has an optical mode that is different than the optical mode of the optical waveguide. For example, the spatial extent of the optical mode associated with the optical coupler may be larger, thereby reducing optical losses and sensitivity to alignment errors. Then, the optical signal is directly coupled from the vertical facet to a facing vertical facet of an identical optical coupler on another substrate, and the optical signal is conveyed in another optical waveguide disposed on the other substrate.

By facilitating direct optical coupling of the optical signal, the MCM may facilitate high-fidelity signaling between the substrates with low-loss coupling and broadband transmission. In particular, direct optical coupling may reduce the optical path length and, thus, the divergence of the optical signals, which reduces optical losses. As a consequence, the MCM may have improved performance in applications such as high-performance computing (such as the macrochip).

Figure 1:
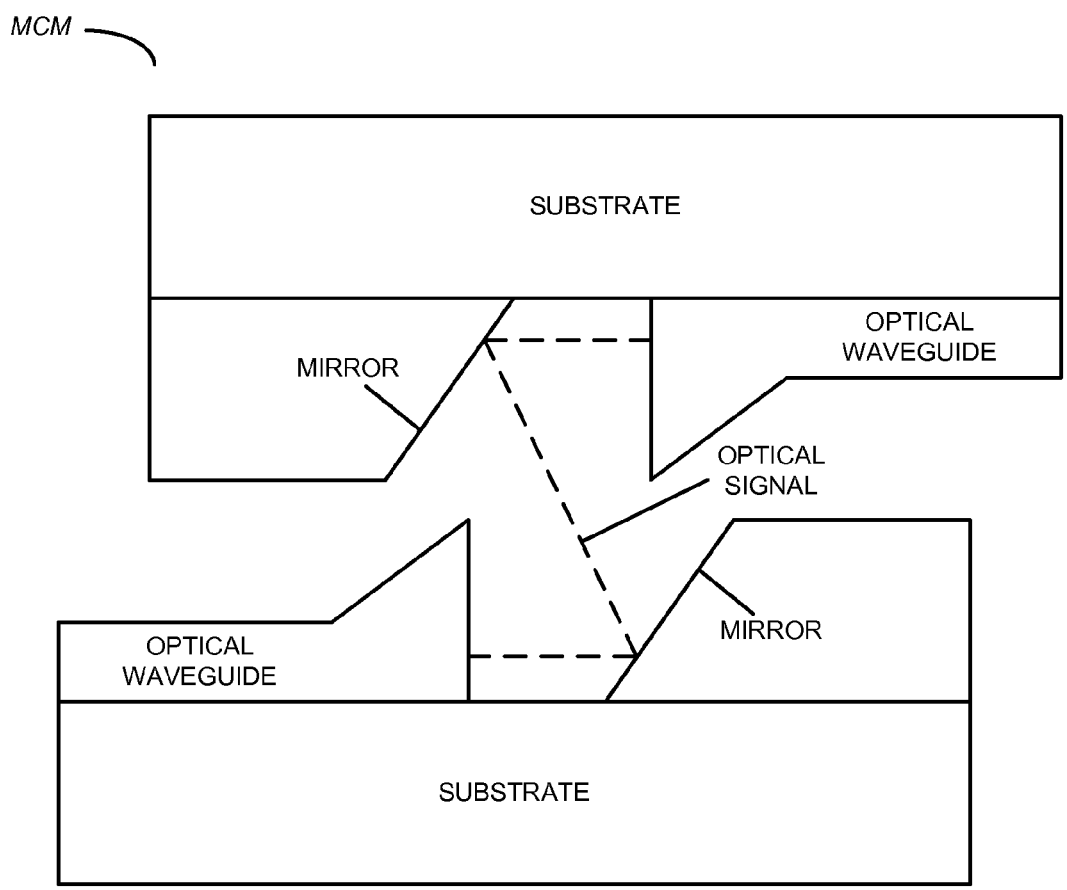
FIG. 1 is a block diagram illustrating a side view of an existing multi-chip module (MCM) with optical proximity couplers (OPxCs).
Figure 2:
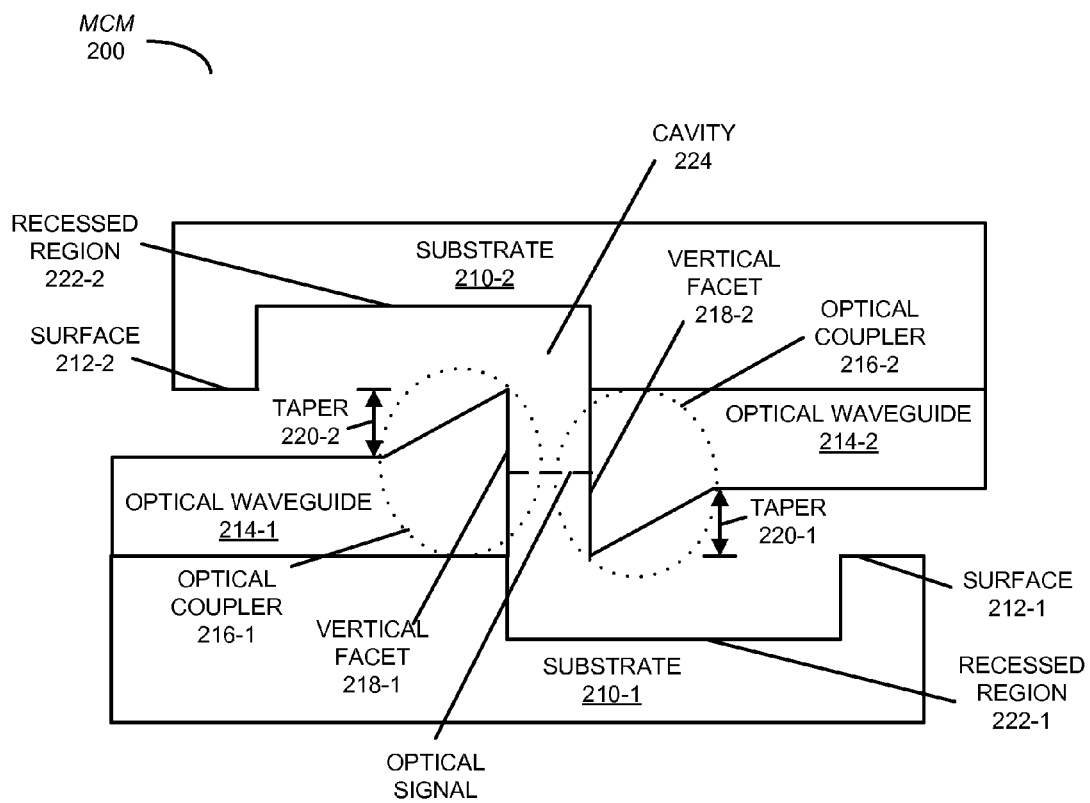
FIG. 2 is a block diagram illustrating a side view of an MCM with direct interlayer optical coupling in accordance with an embodiment of the present disclosure.

We now describe embodiments of the MCM. FIG. 2 presents a block diagram illustrating a side view of an MCM 200 with direct interlayer optical coupling. This MCM includes a substrate 210-1 (such as a semiconductor die or chip) having a surface 212-1 and a substrate 210-2 having a surface 212-2 (which faces surface 212-1). Substrate 210-1 may include: an optical waveguide 214-1 disposed on surface 212-1 (for example, as described below with reference to FIG. 13, optical waveguide 214-1 may be implemented using silicon-on-insulator technology); and an optical coupler 216-1, optically coupled to optical waveguide 214-1, having an etched vertical facet 218-1. Note that optical coupler 216-1 has an optical mode that is different than an optical mode associated with optical waveguide 214-1.

Moreover, substrate 210-2 may include: an optical waveguide 214-2 disposed on surface 212-2; and an optical coupler 216-2, optically coupled to optical waveguide 214-2, having an etched vertical facet 218-2. Note that optical coupler 216-2 has an optical mode that is different than an optical mode associated with optical waveguide 214-2. Furthermore, vertical facet 218-2 may be horizontally displaced relative to and may face vertical facet 218-1 (i.e., optical waveguides 214 may be butt-coupled), thereby facilitating direct optical coupling of an optical signal between vertical facets 218. In particular, note that vertical facets 218 may be precisely vertically aligned with respect to each other to reduce the optical coupling loss.

In order to increase tolerance for misalignment (such as that associated with process variation and/or misalignment) and to reduce optical divergence (and, thus, to reduce optical losses), the optical modes of optical couplers 216 may have larger spatial extent than the optical modes of optical waveguides 214. In some embodiments, the optical modes associated with components on substrate 210-1 are different than the optical modes associated with corresponding components on substrate 210-2. However, in other embodiments the optical modes associated with corresponding components on substrates 210 are the same.

As shown in FIG. 2, optical coupler 216-1 may include a taper 220-1 that expands a cross-sectional area of optical waveguide 214-1 proximate to vertical facet 218-1, and optical coupler 216-2 may include a taper 220-2 that expands a cross-sectional area of optical waveguide 214-2 proximate to vertical facet 218-2. These tapers may adiabatically expand the optical modes of optical waveguides 214 in optical couplers 216. For example, tapers 220 may be up to 12 μm in height and may have a horizontal extent of up to 20 μm. These vertical tapers may provide clearance between substrates 210 that can accommodate other devices and components on substrates 210.

Furthermore, substrate 210-1 may include a recessed region 222-1 (such as a trench) below surface 212-1 and substrate 210-2 may include a recessed region 222-2 below surface 212-2. In these embodiments, vertical facet 218-1 may be aligned with recessed region 222-2 and vertical facet 218-2 may be aligned with recessed region 222-1, thereby facilitating vertical alignment of vertical facets 218 (i.e., without vertical misalignment and the associated optical losses).

Note that vertical facets 218 may, at least in part, define a cavity 224. This cavity may be filled with air. Alternatively, cavity 224 may be filled with an index-matching material that has an index of refraction between an index of refraction of optical couplers 216 and an index of refraction of air.

Figure 3:
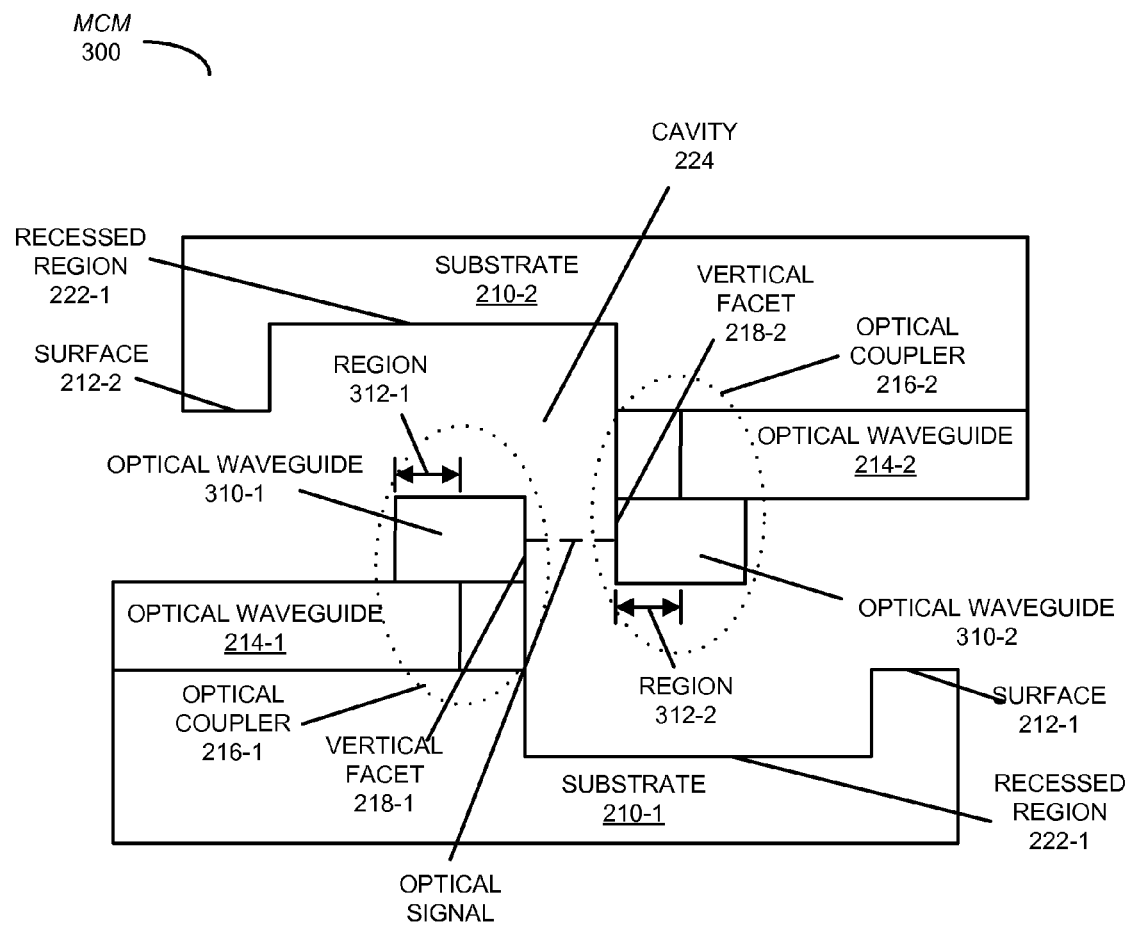
FIG. 3 is a block diagram illustrating a side view of an MCM with direct interlayer optical coupling in accordance with an embodiment of the present disclosure.
Figure 8:
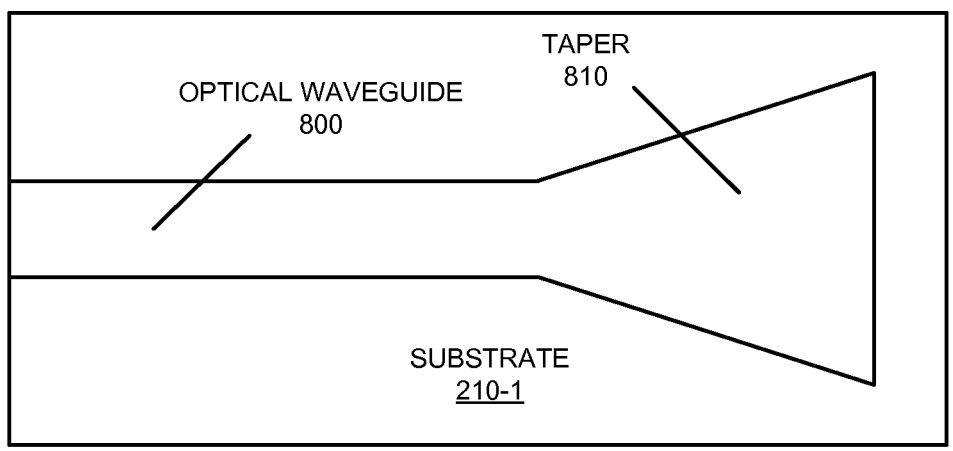
FIG. 8 is a block diagram illustrating a top view of an optical waveguide in accordance with an embodiment of the present disclosure.

In some embodiments, optical couplers 216 may be implemented using additional optical waveguides (e.g., there may not be a taper or, as described below in FIG. 8, the taper may be in the plane of optical waveguides 214). This is shown in FIG. 3, which presents a block diagram illustrating a side view of an MCM 300. In particular, optical coupler 216-1 may include an optical waveguide 310-1 disposed on optical waveguide 214-1, and optical coupler 216-2 may include an optical waveguide 310-2 disposed on optical waveguide 214-2. Note that optical waveguides 214 and 310 may be implemented using a double silicon-on-insulator stack.

As shown in FIG. 3, optical waveguide 214-1 may end before cavity 224 (the material between this end and vertical facet 218-1 may be an oxide) and vertical facet 218-1 may be associated with optical waveguide 310-1. Similarly, optical waveguide 214-2 may end before cavity 224 and vertical facet 218-2 may be associated with optical waveguide 310-2. Note that there may be at least partial overlap of optical waveguides 214 and 310 in regions 312. In overlap region 312-1, the optical signal in optical waveguide 214-1 may be evanescently coupled to optical waveguide 310-1, and in region 312-2 the optical signal in optical waveguide 214-2 may be evanescently coupled to optical waveguide 310-2.

Figure 4:
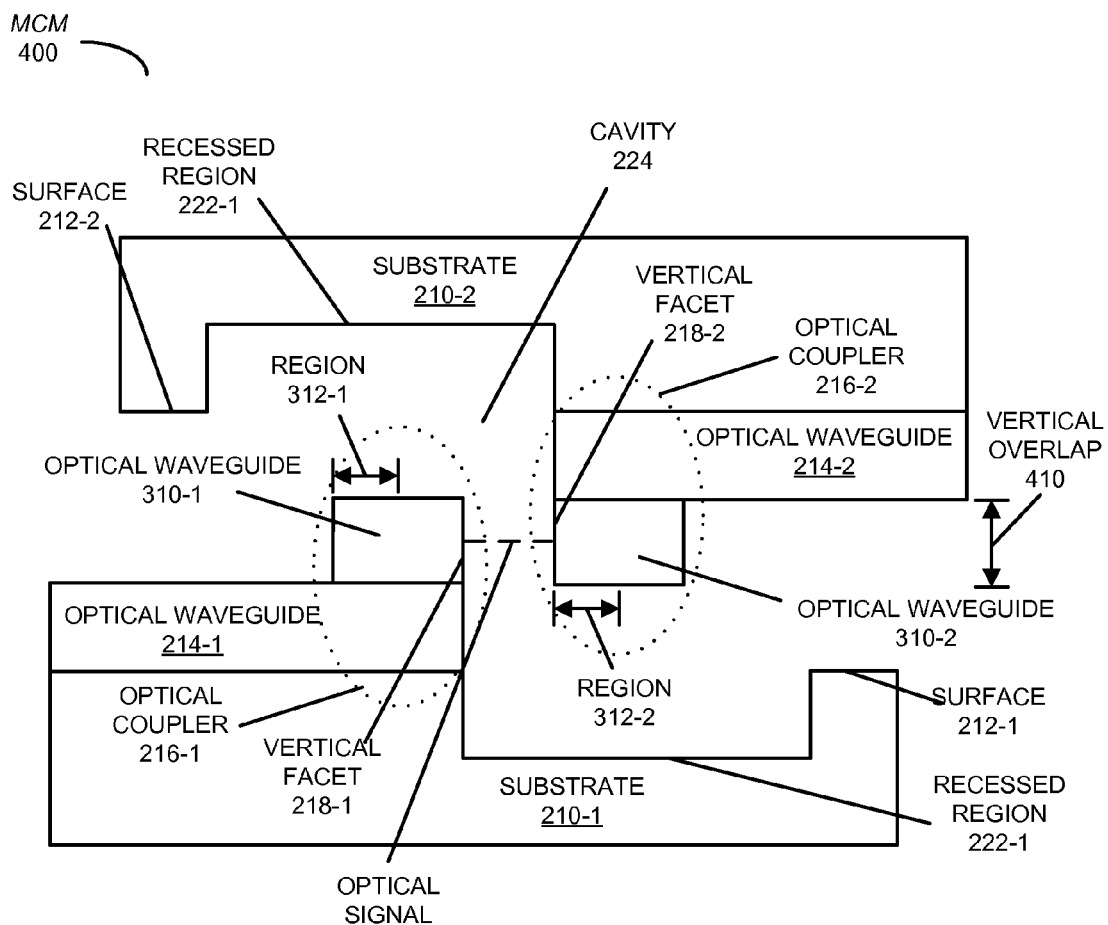
FIG. 4 is a block diagram illustrating a side view of an MCM with direct interlayer optical coupling in accordance with an embodiment of the present disclosure.

Alternatively, as shown in FIG. 4, which presents a block diagram illustrating a side view of an MCM 400, vertical facet 218-1 may be associated with optical waveguides 214-1 and 310-1, and vertical facet 218-2 may be associated with optical waveguides 214-2 and 310-2. In these latter embodiments, vertical overlap 410 of vertical facets 218 may be associated with at least optical waveguides 310. In embodiments where this is the case, the optical signal may be evanescently coupled to and from optical waveguides 310 before vertical facets 218. Note that optical waveguides 310 in FIGS. 3 and 4 may be flat or may be tapered in one or more dimensions to allow some alignment tolerance.

As noted previously, the double-layer optical waveguide structures in optical couplers 216 shown in FIGS. 3 and 4 may be fabricated using bottom-up processing in which the starting material is a single silicon-on-insulator wafer, and a second oxide layer (or an insulator) and a second semiconductor layer are grown and patterned in build-up processing. Alternatively, using substrate 210-1 as an illustration, the double-layer optical waveguide structure may be fabricated using a process in which optical waveguide 214-1 (as well as any nano-photonic devices) are fabricated on a first silicon-on-insulator substrate, and a short optical waveguide (i.e., optical waveguide 310-1) corresponding to optical coupler 216-1 is fabricated on a second silicon-on-insulator substrate that only contains passive optical-waveguide strips. Then, these two silicon-on-insulator substrates can be wafer bonded in a face-to-face configuration with submicron-accuracy active alignment, and the bulk silicon substrate in the second silicon-on-insulator substrate can be removed.

Another fabrication technique may start with commercially available double silicon-on-insulator wafers. In this case, optical couplers 216 may be built up using repeated patterning and etch process steps, which may allow MCM 400 to be fabricated.

Figure 5:
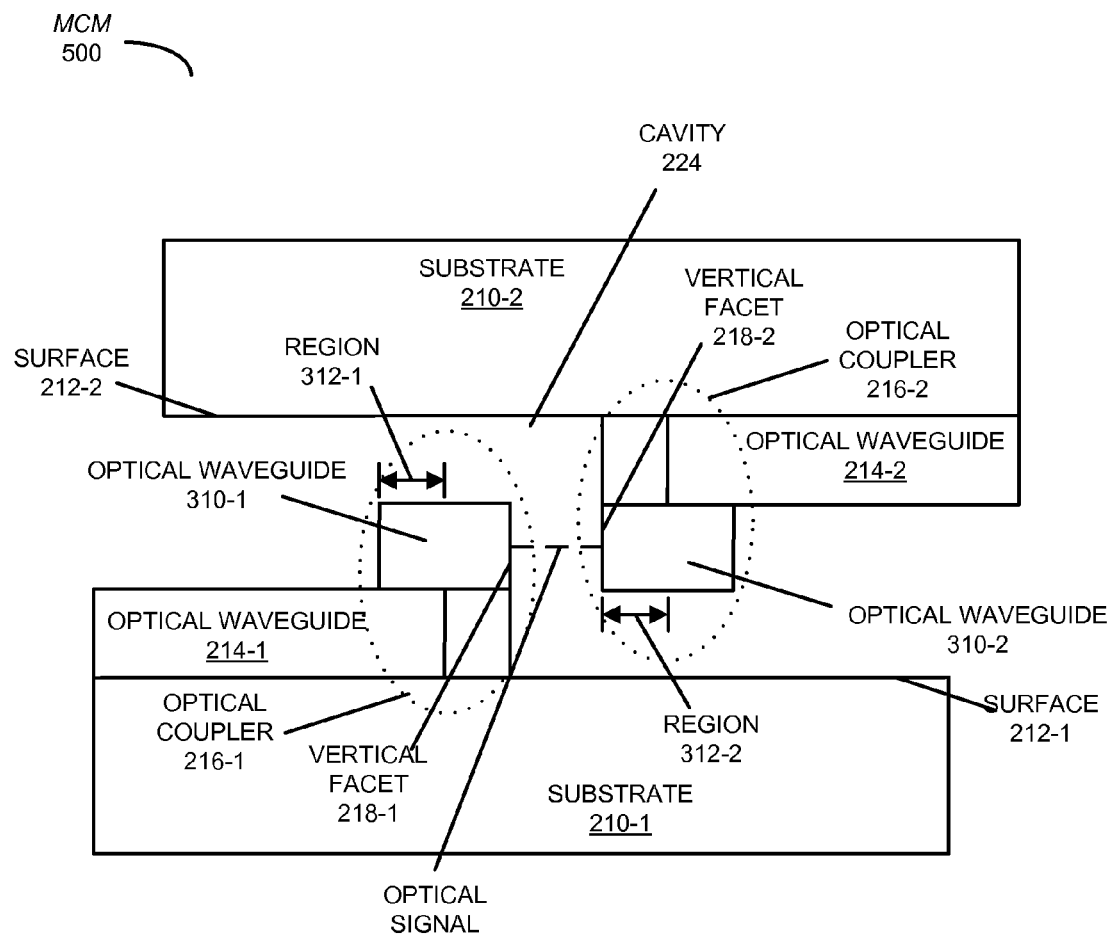
FIG. 5 is a block diagram illustrating a side view of an MCM with direct interlayer optical coupling in accordance with an embodiment of the present disclosure.
Figure 6:
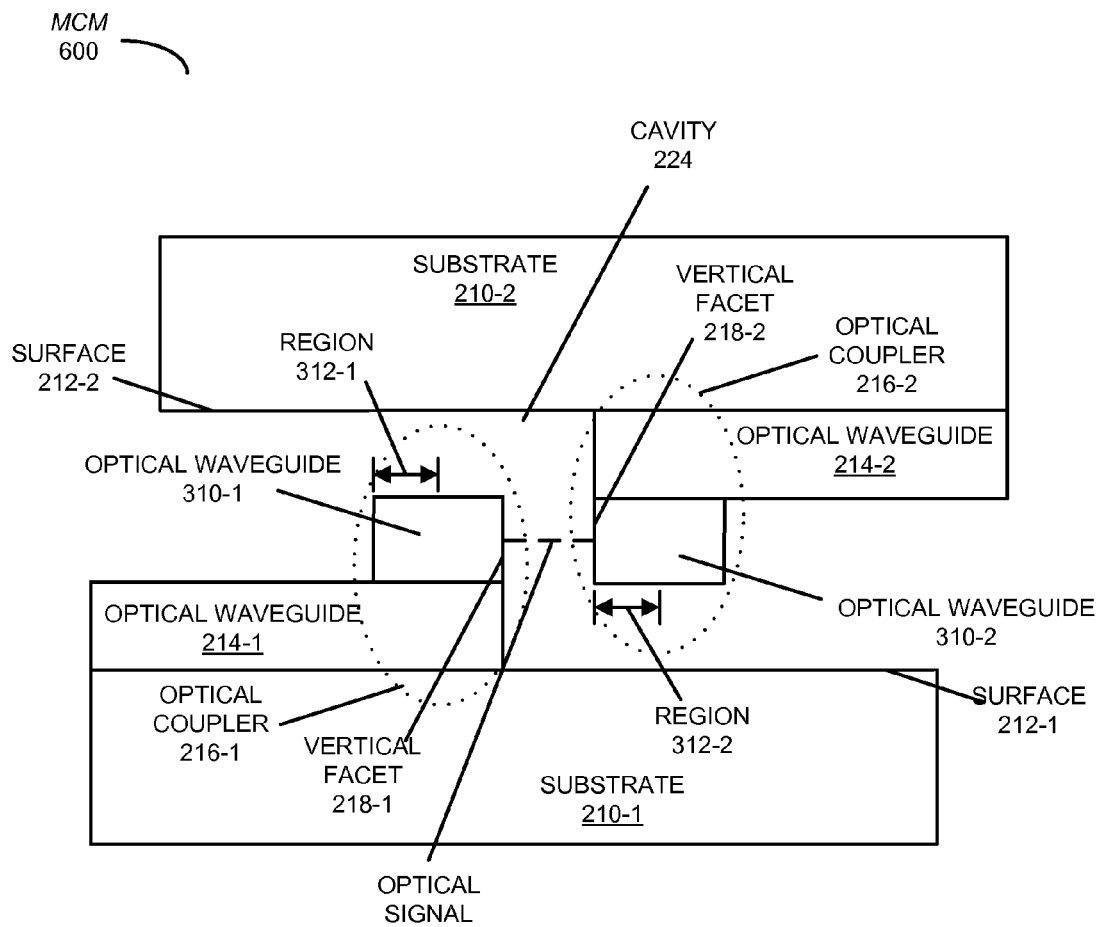
FIG. 6 is a block diagram illustrating a side view of an MCM with direct interlayer optical coupling in accordance with an embodiment of the present disclosure.

While the preceding embodiments illustrated substrates 210 with recessed regions 222, in other embodiments the recessed regions may not be needed. This is shown in FIGS. 5 and 6, which, respectively, present block diagrams illustrating side views of MCM 500 and MCM 600. In particular, if the individual silicon-on-insulator layers in a double silicon-on-insulator structure are sufficiently thick (for example 2-3 µm), then the cavity may not be needed. This is because, if the evanescent coupling couples sufficient light between optical waveguides 214 and 310, only optical waveguides 310 may need to be butt-coupled. Moreover, the thickness of these optical waveguides may be sufficient to provide vertical clearance between substrates 210.

Figure 7:
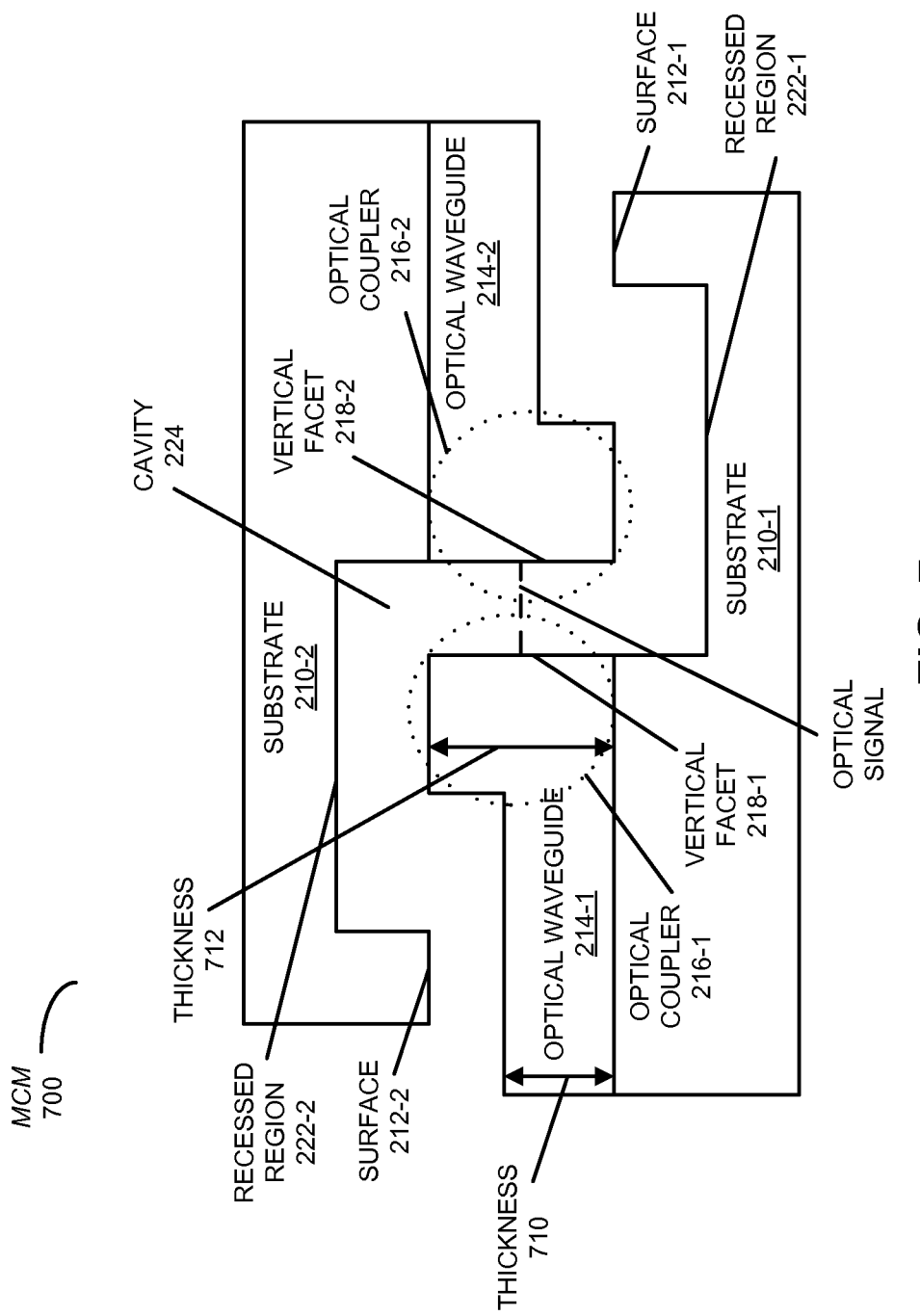
FIG. 7 is a block diagram illustrating a side view of an MCM with direct interlayer optical coupling in accordance with an embodiment of the present disclosure.

In some embodiments, instead of using optical waveguides 310 to expand the spatial extent of the optical modes associated with optical couplers 216, the thickness of optical waveguides 214 may be increased proximate to vertical facets 218. This is shown in FIG. 7, which presents a block diagram illustrating a side view of an MCM 700. In particular, thickness 710 of optical waveguides 214 may be increased to thickness 712 proximate to vertical facets 218, for example, from a thickness of 0.25-3 µm in the transported portion of optical waveguides 214 to a thickness of 2-12 µm in optical couplers 216.

Moreover, as noted previously, in some embodiments the expansion of the spatial extent of the optical modes associated with optical couplers 216 is implemented using tapers in the plane of surfaces 212. This is shown in FIG. 8, which presents a block diagram illustrating a top view of an optical waveguide 800 with taper 810. This taper may be combined with the increased thickness of the optical waveguides proximate to vertical facets shown in FIG. 7. More generally, in embodiments where the optical waveguides are tapered, the taper may be in one or more directions (such as out-of-the-plane and/or in the plane of the surfaces of the substrates).

Figure 9:
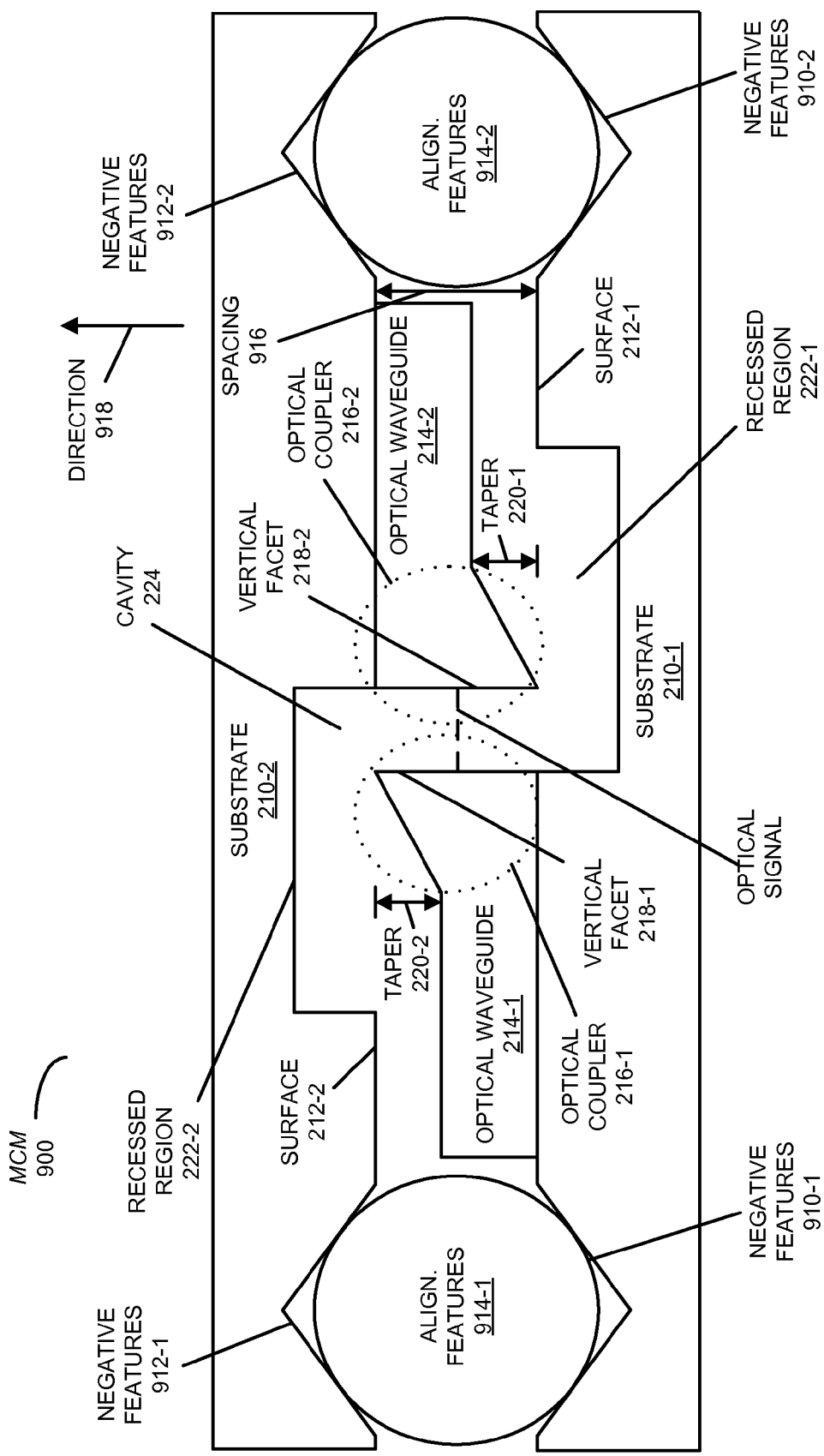
FIG. 9 is a block diagram illustrating a side view of an MCM in accordance with an embodiment of the present disclosure.

Because the coupling efficiency of silicon-photonic OPxCs depends greatly on the accuracy and repeatability of the layer-to-layer alignment, a variety of techniques may be used to facilitate correct assembly of the MCM and to maintain alignment of the components. For example, as shown in FIG. 9, which presents a block diagram illustrating a side view of an MCM 900, substrate 210-1 may include negative features 910 recessed below surface 212-1, and substrate 210-2 may include negative features 912 recessed below surface 212-2. Furthermore, MCM 900 may include alignment features 914 aligned with and mechanically coupled to pairs of negative features 910 and 912, thereby facilitating alignment and maintaining relative positions of vertical facets 218. (For example, negative features 910 and 912 and alignment features 914 may constitute a self-alignment mechanism that remateably or permanently aligns substrates 210.) Using this alignment technique, lateral misalignment in MCM 900 may be fixed and submicron (i.e., nearly zero). In addition, the alignment technique may be used to control spacing 916 and, thus, the misalignment between substrates 210 along direction 918 perpendicular to surfaces 212.

In an exemplary embodiment, negative features 910 and 912 may include etch pits. Furthermore, alignment features 914 may include spherical balls. However, a number of techniques and configurations may be used to implement mechanical alignment of components. In particular, alignment and assembly of the substrates in MCM 900 may be facilitated by positive and/or negative features that may be separated from or included on substrates 210. In general, positive features (which protrude or extend above a surrounding region on a surface) that are included on substrates 210 may be photolithographically defined using an additive (i.e., a material-deposition) and/or a subtractive (i.e., a material-removal) process. These positive features may include: hemispheres, bumps or top-hat shapes, ridges, pyramids, and/or truncated pyramids. Moreover, positive features on a given substrate may mate with or couple to negative features (which are positioned below or recessed relative to a surrounding region on a surface) on another substrate. Note that the negative features may also be photolithographically defined using an additive (i.e., a material-deposition) and/or a subtractive (i.e., a material-removal) process. Furthermore, as shown in FIG. 9, in some embodiments positive and/or negative features on substrates 210 (such as an etch pit or slot) may be used in combination with micro-spheres or balls. This alignment technique can be implemented in a wafer-scale process, thereby facilitating simpler and lower-cost assembly of MCM 900.

Because optical couplers 216 inherently require very small spacing 916 (on the order of microns) between precision structures on substrates 210 (for example, waveguide tapers), there may be some risk of chips/structures being severely damaged due to outlier events even in a well-controlled manufacturing environment. In particular, the OPxC couplers may contain fragile dielectrics that can easily fracture if the two layers are impacted. This risk exists because typical cost-effective assembly tools used in industry have alignment accuracies of greater than 10 µm, and provides another motivation for including alignment features 914 and negative features 910 and 912 in MCM 900.

In an exemplary embodiment, assuming that existing manufacturing pick-and-place tools have a placement accuracy of ±12.7 µm, and assuming that a piece of assembly equipment has a placement accuracy that is twice as inaccurate, i.e., ±25.4 µm, then removing the risk of physical damage to the chips by crushing requires that alignment features 914 have diameters that are larger than 50 µm (if the placement misalignment is no worse than one-half of the diameter).

Figure 10:
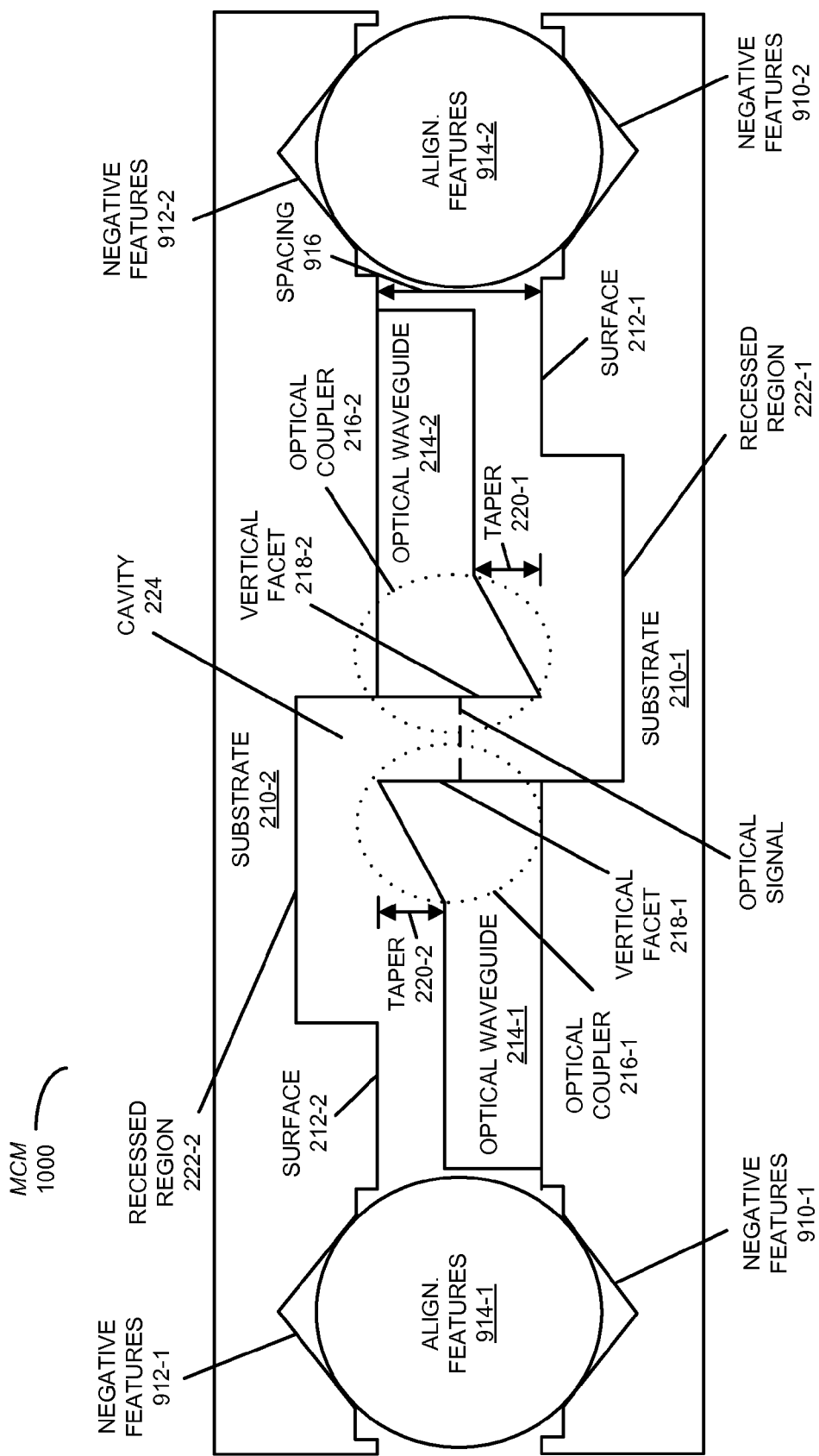
FIG. 10 is a block diagram illustrating a side view of an MCM in accordance with an embodiment of the present disclosure.

Another technique for mitigating this problem is to use an adaptive ball-in-pit structure. This is shown in FIG. 10, which presents a block diagram illustrating a side view of an MCM 1000. In particular, at least one of negative features 910 and 912 includes a small pit fabricated at the base of a larger pit. In this technique, substrates 210 are first aligned (well above the desired final spacing 916) using the larger pit structure, and are constrained both vertically and horizontally. Then, substrates 210 are guided in a controlled manner such that the ball locks into the smaller pit for a controlled soft landing at the desired coupling geometry. In this way, alignment errors during assembly of MCM 1000 and, thus, damage to vertical facets 218 can be prevented.

Figure 11:
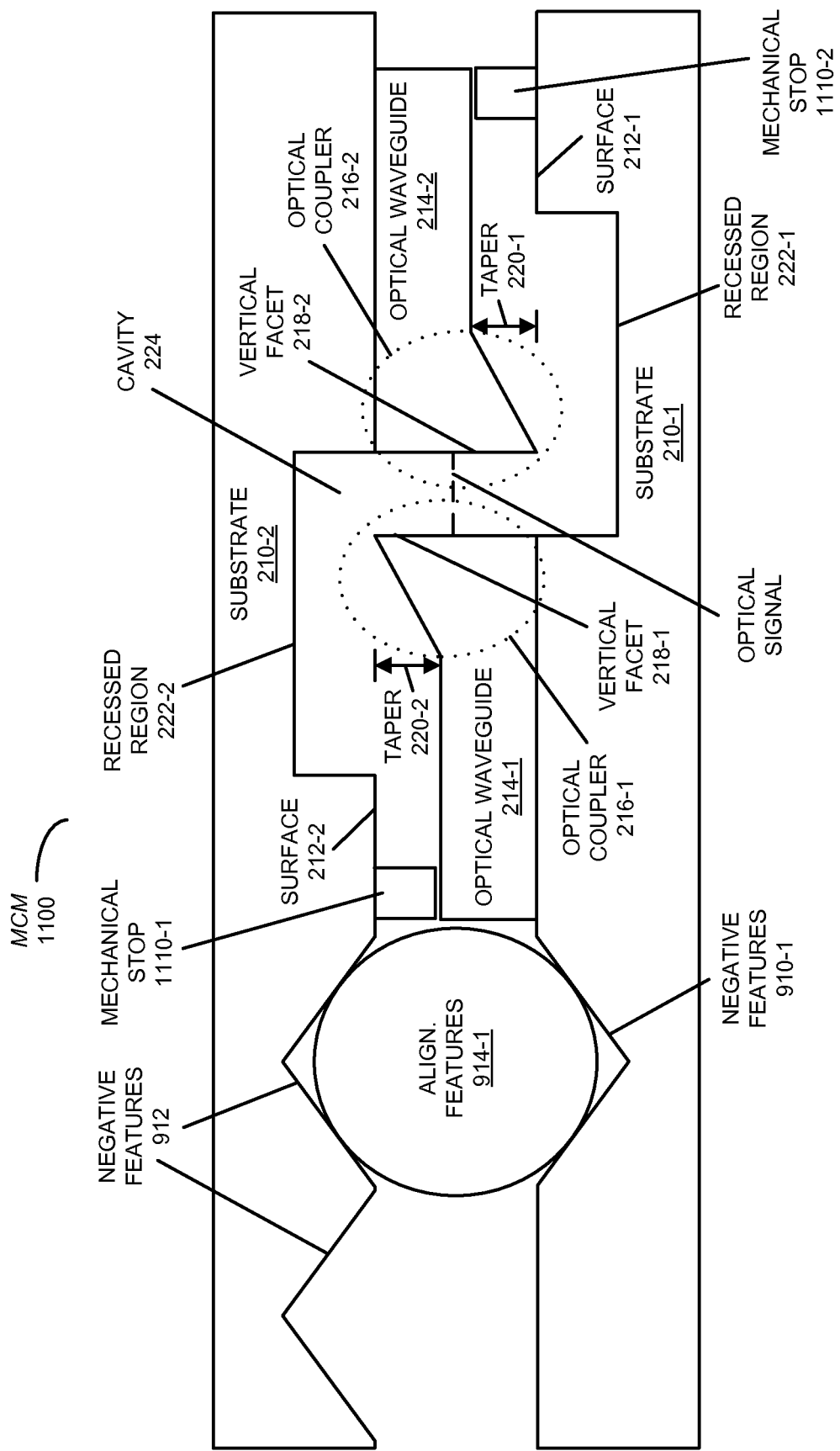
FIG. 11 is a block diagram illustrating a side view of an MCM in accordance with an embodiment of the present disclosure.

Alternatively, at least one of negative features 910 and 912 may include redundant negative features (immediately adjacent to the target pit location) that prevent damage to vertical facets 218 if there is an alignment error during assembly of the MCM. This is shown in FIG. 11, which presents a block diagram illustrating a side view of an MCM 1100. In this way, if the misalignment is greater than 1 ball radius, the ball may be captured in the adjacent pit. While this may result in greater horizontal distance between optical couplers 216 (which may be acceptable) or lateral misalignment (which, in general, would not be acceptable), it can prevent a catastrophic impact during manufacturing. As a consequence, if lateral misalignment occurs, the chips can be disengaged and realigned.

Another technique for preventing a catastrophic impact during manufacturing assembly would be to include vertical mechanical stops 1110 in the design. These mechanical stops may be fabricated on the same polysilicon layer as the waveguide taper. Moreover, mechanical stops 1110 may match the location of recessed regions 222 on the opposite chip. As a consequence, mechanical stops 1110 may prevent damage to vertical facets 218 if there is an alignment error during assembly of the MCM.

Figure 12:
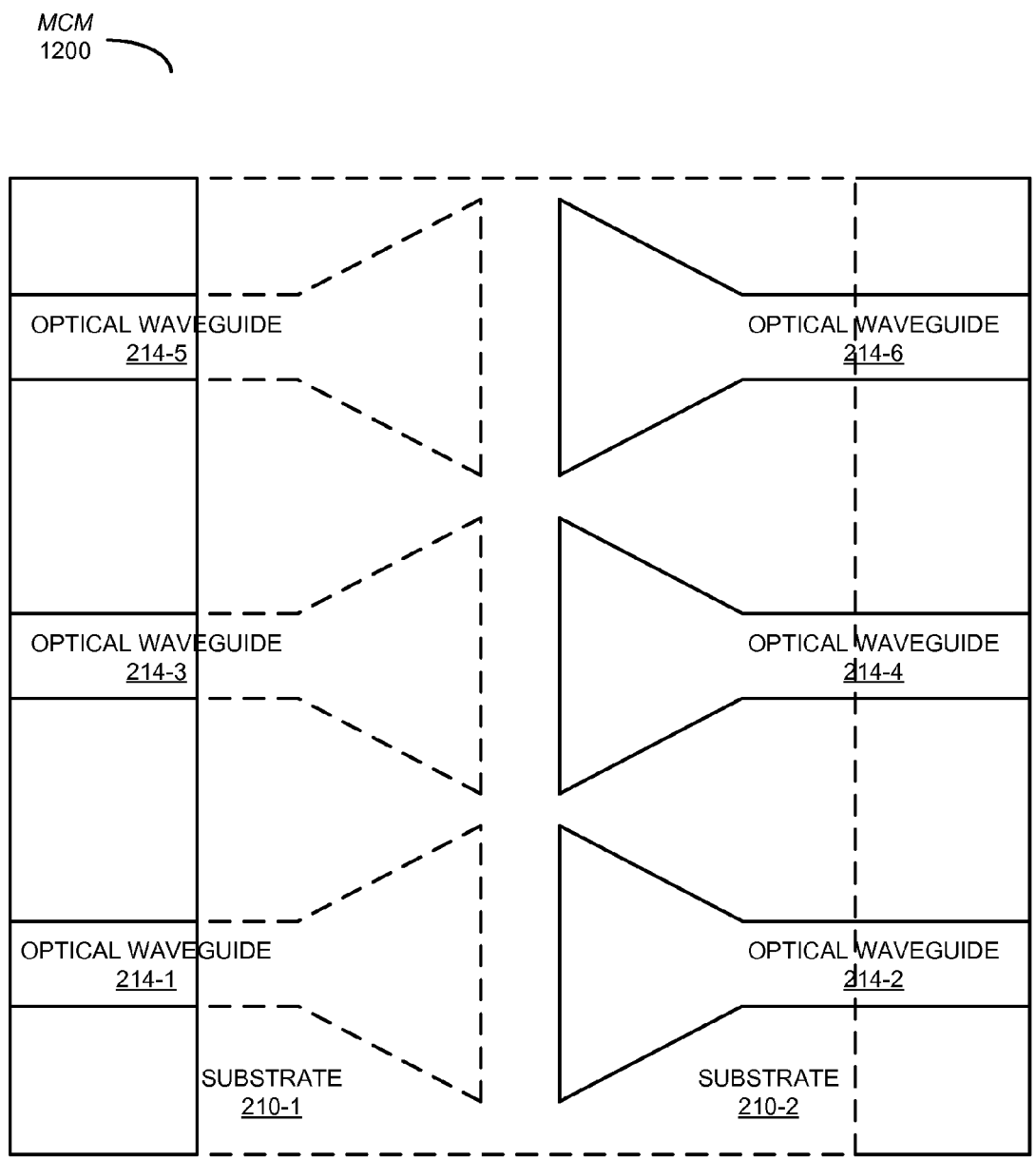
FIG. 12 is a block diagram illustrating a top view of an MCM in accordance with an embodiment of the present disclosure.

In some embodiments, multiple optical waveguides on one chip that are terminated with optical couplers such as those described above may be aligned with an equal number of optical couplers on another chip/layer. When alignment is obtained using structures, such as the ball-in-pit, these optical couplers in the different layers may be concurrently aligned. FIG. 12 presents a block diagram illustrating a top view of an MCM 1200 with multiple optical couplers. In this embodiment, the optical couplers are parallel to one another and terminate at the same horizontal location. As a result, these optical couplers share a common recessed region on the opposing chip. However, this is not a limiting factor. In general, the optical waveguides and the optical couplers may be fabricated at different locations on the substrates and with different orientations so long as the components on the different substrates align with each other with acceptable lateral clearance.

Figure 13:
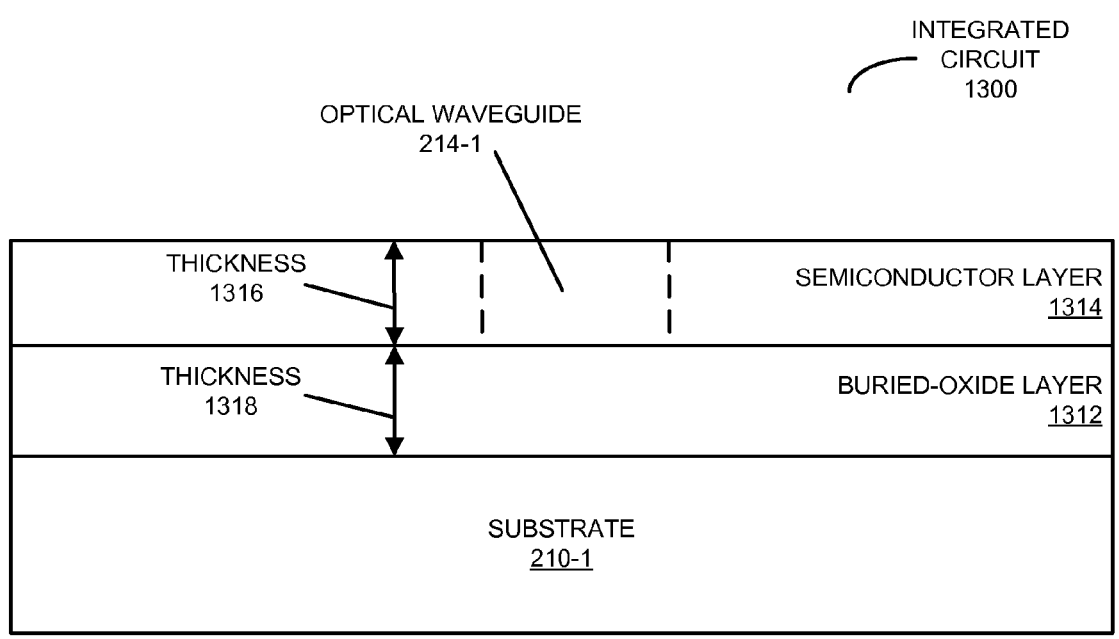
FIG. 13 is a block diagram illustrating a side view of an integrated circuit in accordance with an embodiment of the present disclosure.

As noted previously, the MCM may be implemented using silicon-on-insulator technology. This is shown in FIG. 13, which presents a block diagram illustrating a side view of an integrated circuit 1300. In particular, a given substrate (such as substrate 210-1) in the MCM may include: a buried-oxide layer 1312 disposed on the given substrate; and a semiconductor layer 1314 is disposed on buried-oxide layer 1312. Note that a given optical waveguide (such as optical waveguide 214-1) may be defined in semiconductor layer 1314. Moreover, the given substrate may include a semiconductor.

In an exemplary embodiment, semiconductor layer 1314 may have a thickness 1316 that is less than 1 μm (such as 0.2-0.3 μm). Furthermore, buried-oxide layer 1312 may have a thickness 1318 between 0.3 and 3 μm (such as 0.8 μm).

Figure 14:
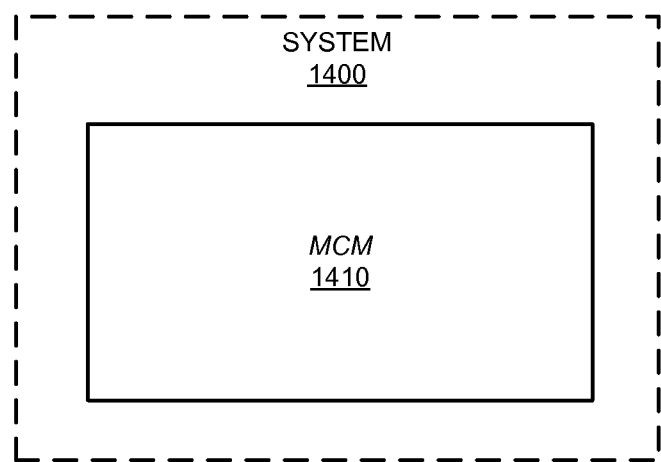
FIG. 14 is a block diagram illustrating a system that includes one or more of the MCMs of FIGS. 1-7 and 9-12 in accordance with an embodiment of the present disclosure.

We now describe embodiments of the system. FIG. 14 presents a block diagram illustrating a system 1400 that includes an MCM 1410, such as one or more of the preceding embodiments of the MCM. System 1400 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, and/or another electronic computing device. Note that a given computer system may be at one location or may be distributed over multiple, geographically dispersed locations.

The preceding embodiments of the MCM, as well as integrated circuit 1300 and system 1400, may include fewer components or additional components. Moreover, the substrates may include: a semiconductor die (such as silicon), a ceramic, an organic material and/or glass. Furthermore, in some embodiments alignment of components in the MCM is facilitated using spring clamps, which may be fabricated on the surfaces of the substrates.

Although the MCMs and the system are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. In addition, functionality in the preceding embodiments may be implemented more in hardware and less in software, or less in hardware and more in software, as is known in the art.

Figure 15:
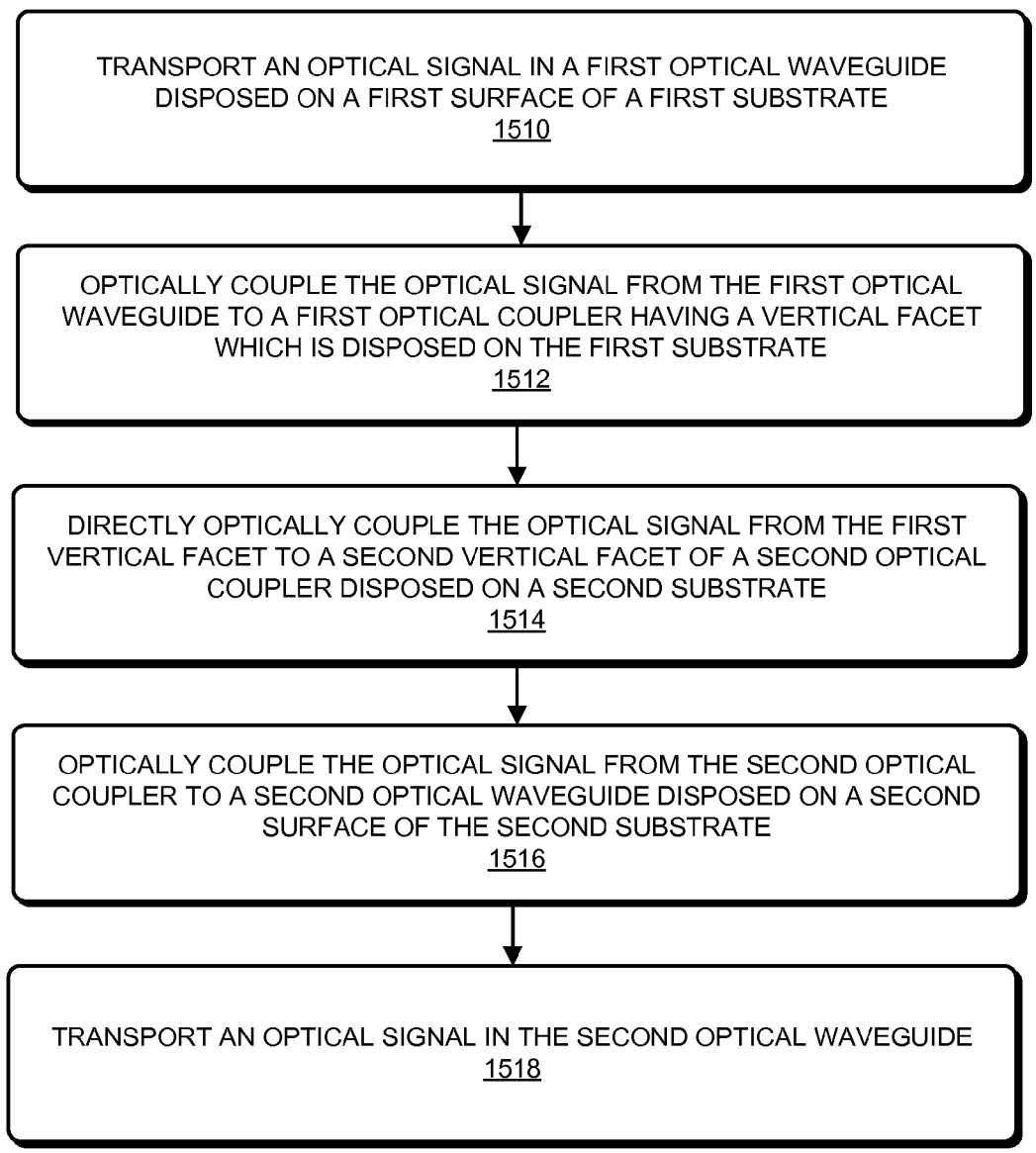
FIG. 15 is a flow diagram illustrating a method for direct optical coupling an optical signal from a first substrate to a second substrate in one of the MCMs of FIGS. 1-7 and 9-12 in accordance with an embodiment of the present disclosure.

We now discuss embodiments of the methods. FIG. 15 presents a flow diagram illustrating a method 1500 for direct optical coupling an optical signal from a first substrate to a second substrate in an MCM, such as one or more of the preceding embodiments of the MCM. During this method, the optical signal is transported in a first optical waveguide disposed on a first surface of the first substrate (operation 1510). Then, the optical signal is optically coupled from the first optical waveguide to a first optical coupler having a first vertical facet which is disposed on the first substrate (operation 1512), where the first optical coupler has a first optical mode that is different than a second optical mode associated with the first optical waveguide. Moreover, the optical signal is direct optical coupled from the first vertical facet to a second vertical facet of a second optical coupler disposed on the second substrate (operation 1514), where the first vertical facet faces the second vertical facet. Furthermore, the optical signal is optically coupled from the second optical coupler to a second optical waveguide disposed on a second surface of the second substrate (operation 1516), where the second surface faces the first surface, and the second optical coupler has a third optical mode that is different than a fourth optical mode associated with the second optical waveguide. Next, the optical signal is transported in the second optical waveguide (operation 1518).

Figure 16:
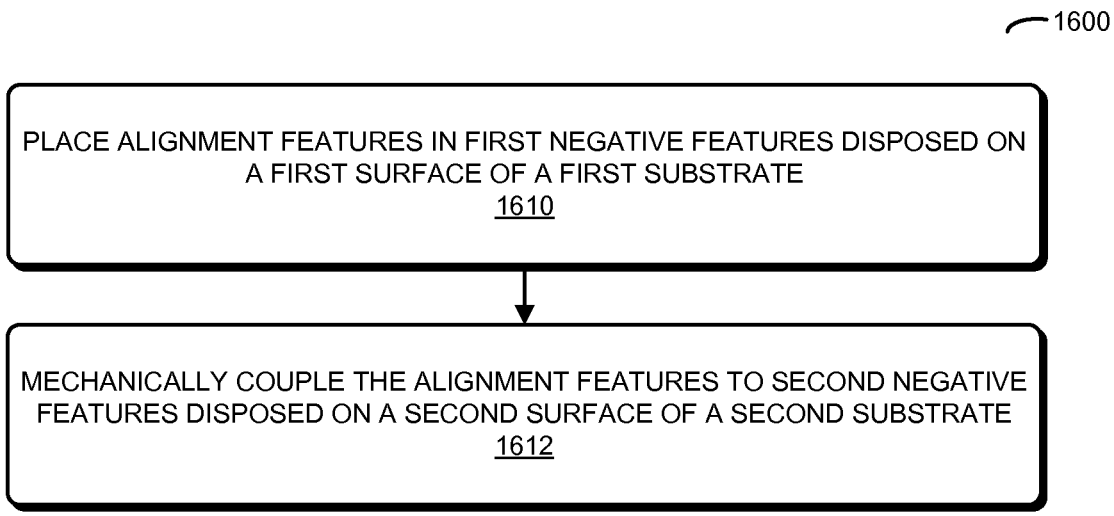
FIG. 16 is a flow diagram illustrating a method for assembling one of the MCMs of FIGS. 1-7 and 9-12 in accordance with an embodiment of the present disclosure.

FIG. 16 presents a flow diagram illustrating a method 1600 for assembling an MCM, such as one or more of the preceding embodiments of the MCM. During this method, alignment features are placed in first negative features disposed on a first surface of a first substrate (operation 1610). Then, the alignment features are mechanically coupled to second negative features disposed on a second surface of a second substrate (operation 1612), thereby aligning and maintaining relative positions of a first vertical facet of a first optical coupler on the first substrate and a second vertical facet of a second optical coupler on the second substrate. Note that the first surface faces the second surface, and the first vertical facet faces the second vertical facet, thereby facilitating direct optical coupling of an optical signal from the first substrate to the second substrate.

In some embodiments of methods 1500 and/or 1600 there may be additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A multi-chip module (MCM), comprising:
a first substrate having a first surface, wherein the first substrate includes:
a first optical waveguide disposed on the first surface; and
a first optical coupler, optically coupled to the first optical waveguide, having a first vertical facet, wherein the first optical coupler has a first optical mode that is different than a second optical mode associated with the first optical waveguide; and
a second substrate having a second surface facing the first surface of the first substrate, wherein the second substrate includes:
a second optical waveguide disposed on the second surface; and
a second optical coupler, optically coupled to the second optical waveguide, having a second vertical facet, wherein the second optical coupler has a third optical mode that is different than a fourth optical mode associated with the second optical waveguide;
wherein the second vertical facet is horizontally displaced relative to and faces the first vertical facet, thereby facilitating direct optical coupling of an optical signal from the first vertical facet to the second vertical facet.

2. The MCM of claim 1, wherein the first optical mode has a larger spatial extent than the second optical mode; and
wherein the third optical mode has a larger spatial extent than the fourth optical mode.

3. The MCM of claim 1, wherein the first vertical facet and the second vertical facet define a cavity; and
wherein the cavity is filled with air.

4. The MCM of claim 1, wherein the first vertical facet and the second vertical facet define a cavity; and
wherein the cavity is filled with an index-matching material that has an index of refraction between an index of refraction of the first optical coupler and the second optical coupler and an index of refraction of air.

5. The MCM of claim 1, wherein the first optical coupler includes a taper that expands a cross-sectional area of the first optical waveguide proximate to the first vertical facet; and
wherein the second optical coupler includes another taper that expands a cross-sectional area of the second optical waveguide proximate to the second vertical facet.

6. The MCM of claim 1, wherein the first substrate includes a first recessed region below the first surface;
wherein the second substrate includes a second recessed region below the second surface; and
wherein the first vertical facet is aligned with the second recessed region and the second vertical facet is aligned with the first recessed region, thereby facilitating vertical alignment of the first vertical facet and the second vertical facet.

7. The MCM of claim 1, wherein the first optical coupler includes a third optical waveguide disposed on the first optical waveguide; and
wherein the second optical coupler includes a fourth optical waveguide disposed on the second optical waveguide.

8. The MCM of claim 7, wherein the first optical waveguide ends before the cavity and the first vertical facet is associated with the third optical waveguide; and
wherein the second optical waveguide ends before the cavity and the second vertical facet is associated with the fourth optical waveguide.

9. The MCM of claim 7, wherein the first vertical facet is associated with the first optical waveguide and the third optical waveguide; and
wherein the second vertical facet is associated with the second optical waveguide and the fourth optical waveguide.

10. The MCM of claim 9, wherein vertical overlap of the first vertical facet and the second vertical facet is associated with the third optical waveguide and the fourth optical waveguide.

11. The MCM of claim 1, wherein the first optical waveguide in the first optical coupler is untapered, and wherein the second optical waveguide in the second optical coupler is untapered.

12. The MCM of claim 1, wherein the first substrate includes first negative features recessed below the first surface;
wherein the second substrate includes second negative features recessed below the second surface; and
wherein the MCM further includes alignment features aligned with and mechanically coupled to pairs of the first negative features and the second negative features, thereby facilitating alignment and maintaining relative positions of the first vertical facet and the second vertical facet.

13. The MCM of claim 1, wherein the first negative features and the second negative features include etch pits.

14. The MCM of claim 1, wherein the alignment features include spherical balls.

15. The MCM of claim 1, wherein at least one of the first negative features and the second negative features includes redundant negative features.

16. The MCM of claim 1, wherein the first substrate and the second substrate include mechanical stops.

17. The MCM of claim 1, wherein a given substrate, which is one of the first substrate and the second substrate, includes:
a buried-oxide layer disposed on the given substrate; and
a semiconductor layer disposed on the buried-oxide layer, wherein a given optical waveguide, which is one of the first optical waveguide and the second optical waveguide, is defined in the semiconductor layer.

18. The MCM of claim 1, wherein a given substrate, which is one of the first substrate and the second substrate, includes a semiconductor.

19. A method for direct optical coupling an optical signal from a first substrate to a second substrate, the method comprising:
transporting the optical signal in a first optical waveguide disposed on a first surface of the first substrate;
optically coupling the optical signal from the first optical waveguide to a first optical coupler having a first vertical facet which is disposed on the first substrate, wherein the first optical coupler has a first optical mode that is different than a second optical mode associated with the first optical waveguide;
direct optical coupling the optical signal from the first vertical facet to a second vertical facet of a second optical coupler disposed on the second substrate, wherein the first vertical facet faces the second vertical facet;
optically coupling the optical signal from the second optical coupler to a second optical waveguide disposed on a second surface of the second substrate, wherein the second surface faces the first surface, and wherein the second optical coupler has a third optical mode that is different than a fourth optical mode associated with the second optical waveguide; and transporting the optical signal in the second optical waveguide.

20. A method for assembling an MCM, the method comprising:

placing alignment features in first negative features disposed on a first surface of a first substrate; and mechanically coupling the alignment features to second negative features disposed on a second surface of a second substrate, thereby aligning and maintaining relative positions of a first vertical facet of a first optical coupler on the first substrate and a second vertical facet of a second optical coupler on the second substrate, wherein the first surface faces the second surface; and wherein the first vertical facet faces the second vertical facet, thereby facilitating direct optical coupling of an optical signal from the first substrate to the second substrate.

* * * * *

UNITED STATES PATENT AND TRADEMARK OFFICE
CERTIFICATE OF CORRECTION

PATENT NO.       : 8,548,287 B2
APPLICATION NO.  : 13/293624
DATED            : October 1, 2013
INVENTOR(S)      : Thacker et al.

It is certified that error appears in the above-identified patent and that said Letters Patent is hereby corrected as shown below:

On title page, column 2, under Other Publications, Line 10, delete "Macrochiop" and insert -- Macrochip --, therefor.

Signed and Sealed this
Twenty-fifth Day of February, 2014

Michelle K. Lee
*Deputy Director of the United States Patent and Trademark Office*